Oct. 26, 1954  E. G. MORRISON  2,692,636
COMBINATION AUTOMOBILE MECHANIC'S CREEPER AND STOOL
Filed Dec. 5, 1950                                    2 Sheets-Sheet 1
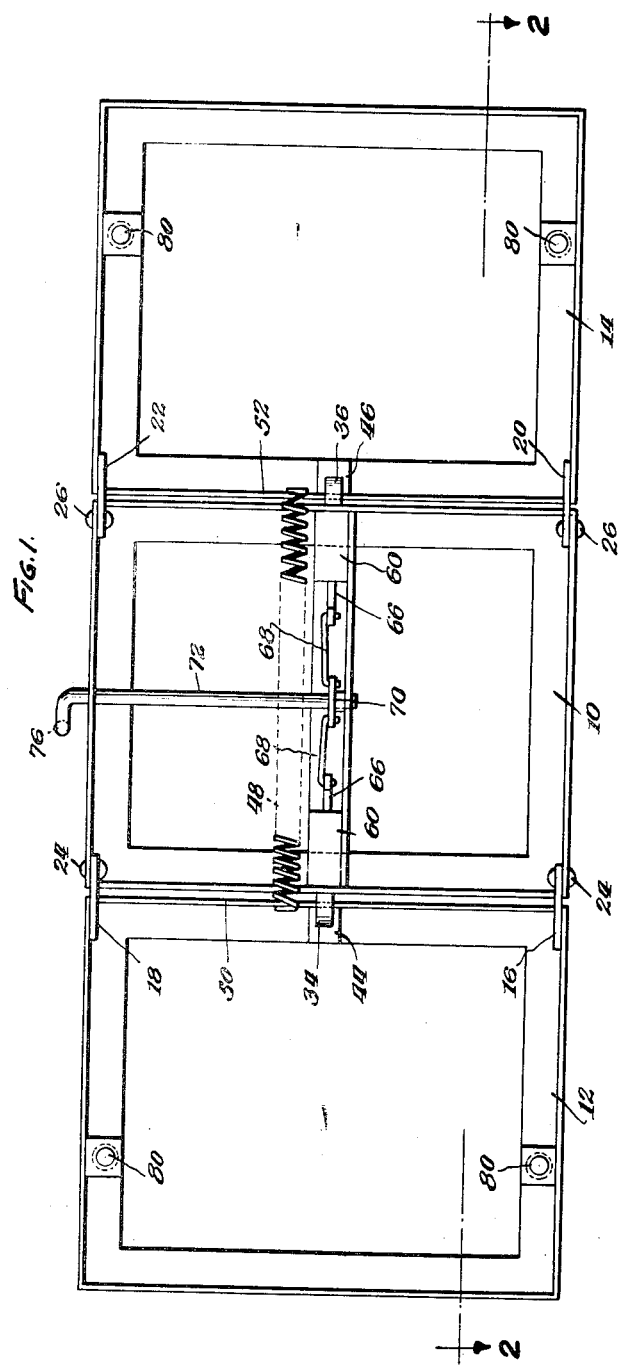
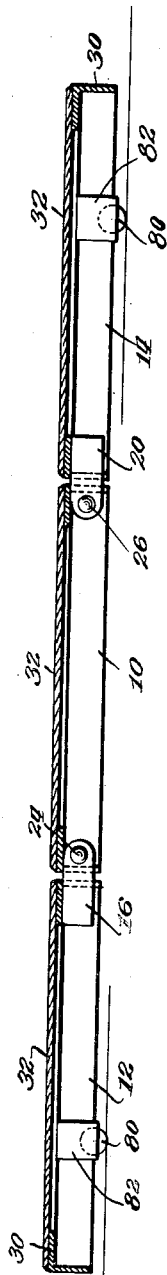
INVENTOR
EMMETT G. MORRISON
BY Harry H. Hitzeman
ATTORNEY.

Oct. 26, 1954  E. G. MORRISON  2,692,636
COMBINATION AUTOMOBILE MECHANIC'S CREEPER AND STOOL
Filed Dec. 5, 1950  2 Sheets-Sheet 2
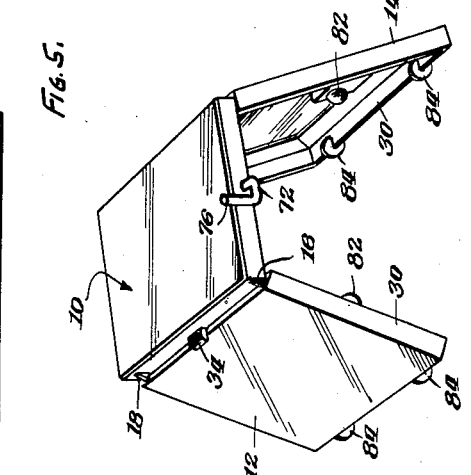
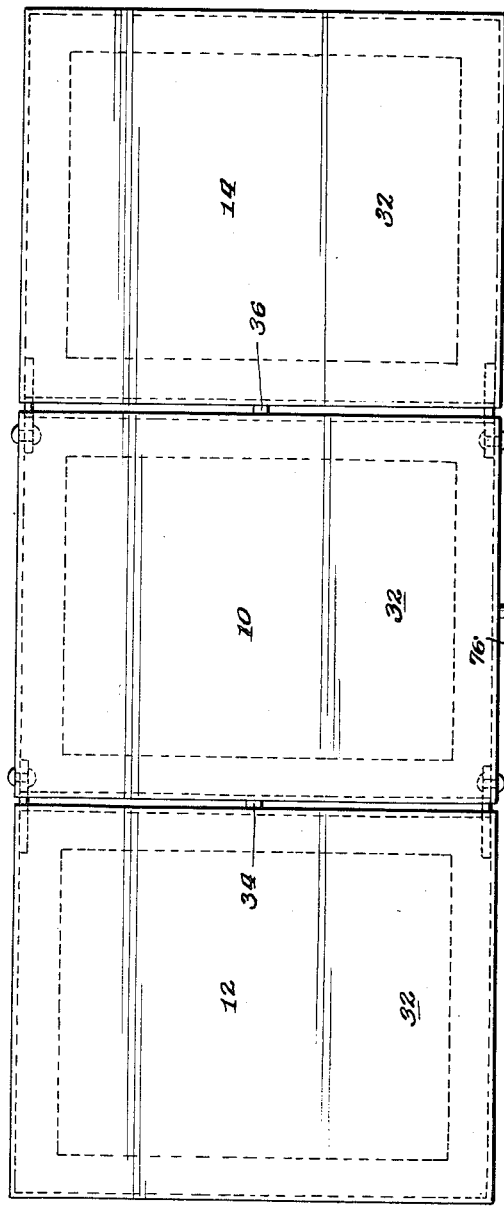
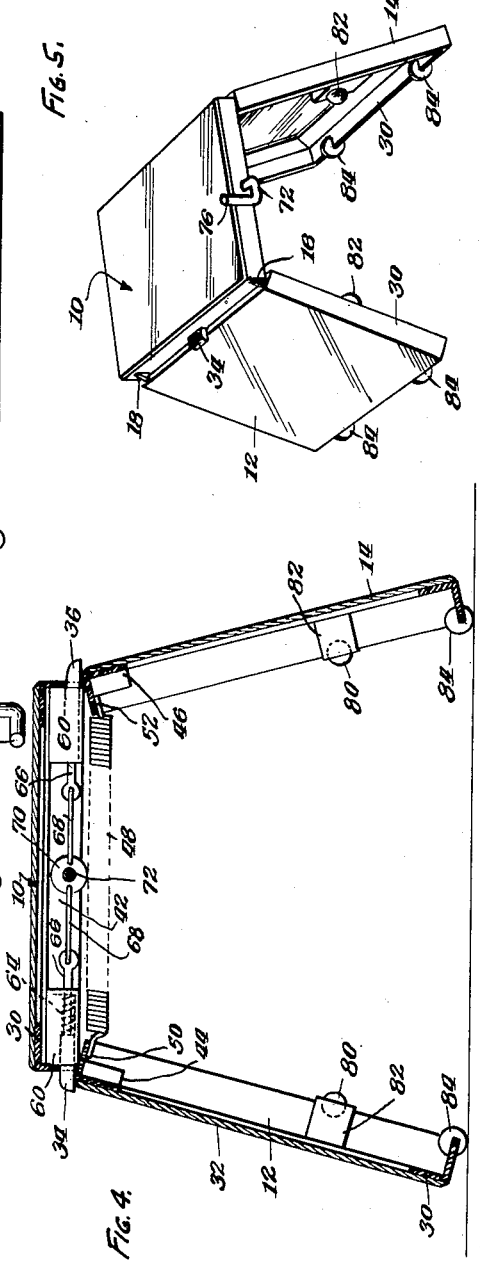
INVENTOR
EMMETT G. MORRISON
BY Harry H. Hitzeman
ATTORNEY.

Patented Oct. 26, 1954

2,692,636

UNITED STATES PATENT OFFICE 2,692,636

COMBINATION AUTOMOBILE MECHANIC'S CREEPER AND STOOL

Emmett G. Morrison, Elgin, Ill., assignor of one-tenth to Earl H. Gromer, Elgin, Ill.

Application December 5, 1950, Serial No. 199,291

3 Claims. (Cl. 155—41)

My invention relates to improvements in a combined automobile mechanics' creeper and stool.

My invention relates more particularly to improvements in the construction of devices of this type which are capable of being used both as a creeper to lie on and roll under a car wherever necessary, and also a structure whereby, by either kicking or moving a lever, it will automatically become a stool upon which the mechanic may sit or stand to work upon higher portions of the car.

The principal object of the present invention is to provide an improved automobile mechanics' creeper in the form of a sectional supporting platform having a center and right and left sections hingedly connected thereto, the right and left sections being capable of assuming and holding both an aligned planar position and an angularly disposed supporting position.

A further object of the invention is to provide a structure of the type described which may be either locked in an aligned planar position to be used as a creeper or locked in a position wherein the right and left sections are supporting the center section as a stool.

A further object of the invention is to provide an improved creeper and stool device of the type described which may be locked in either position, yet is capable of being released and changed by means of a lever actuated device that may be kicked or manually operated.

A further object of the invention is to provide an improved combined creeper and stool of the type described which has spring means associated therewith for changing the relative position of the side platforms when the use of the device as a stool is desired.

A further object of the invention is to provide an improved construction of combined creeper and stool wherein either a manual or foot operated lever is capable of locking the mechanism in either a creeper or a stool position.

Other objects and advantages will be more apparent from the following description wherein reference is had to the accompanying drawings upon which Fig. 1 is a bottom plan view of my improved combined creeper and stool construction shown in a flattened position, as when used for a creeper;

Fig. 2 is a vertical cross-sectional view therethrough taken generally on the line 2—2 of Fig. 1;

Fig. 3 is a plan view of the combined creeper and stool and its extended position for use as a creeper;

Fig. 4 is a cross-sectional view taken generally through the center of the same in its changed position wherein the right and left platform members are locked as leg supports so that the same can be used as a stool; and Fig. 5 is a perspective view thereof in changed position for use as a stool.

In the embodiment of the invention in which I have chosen to illustrate and describe the same, the combined creeper and stool which I have invented may include generally a center platform 10 and a left and right platform 12 and 14 respectively, the right and left platforms being hingedly connected to the center platform by means of strap members 16 and 18 connecting the member 12 to the center platform member 10, and the strap members 20 and 22 connecting the member 14 to the center member 10. Suitable pivots 24 are provided for the strap members 16 and 18, and similar pivots 26 are provided for the strap members 20 and 22.

The platform members 10, 12 and 14 may all be generally similar in construction and may be formed from an inverted angle member 30 bent to the rectangular shape as shown. Each of the rectangularly shaped angle members may be provided with a flat rectangular plate 32 fastened to the top thereof and providing the support upon which a mechanic may rest when using the creeper.

The means for locking the center and the right and left platforms in alignment may comprise a pair of lock bolts 34 and 36 mounted in suitable housing members 38 and 40 secured to an angle member 42 medially disposed on the bottom side of the center platform 10.

In normal position when the device is used as a creeper, the lock bolts 34 and 36, as best shown in Fig. 1, extend forward beneath a pair of block members 44 and 46 fastened to the frame of the right and left platforms 12 and 14 in such manner that the center and the right and left platforms are held in a horizontally aligned position by means of the lock bolt members.

In order to permit the angular displacement of the right and left platform members about their hinges, the lock bolts 34 and 36 may be withdrawn so that the coiled spring member 48, connected between the end wall 50 of the platform member 12 and the end wall 52 of the platform member 14, may collapse the same to the position shown in Fig. 4, at which time the lock bolts 34 and 36 may again be extended to lock the creeper in the position it assumes when it becomes a stool.

The lock bolts 34 and 36, as previously stated, are mounted in suitable housings 38 and 40 connected to the bottom of the angle member 30 of the center platform 10 and each include a coiled spring 64 normally urging the bolt members outwardly. Each of the bolt members is provided with an arm 66 which connects with a wire 68 connected to a disc 70 fastened on the end of kick-out lever 72. The kick-out lever 72 extends through the edge of the angle member 30 of the center platform 10 and has an upright shoulder 76 so that when it is desired to collapse the stool from the position shown in Fig. 4, by pressing down on the member 76 the disc member 70 is rotated approximately 90 degrees, retracting the lock bolts 34 and 36 so that the stool can be flattened out and the left and right platform members 12 and 14 may again become aligned and locked with the center platform member 10.

The usual rollers 80 carried by appropriate brackets 82 are provided adjacent the sides of each of the right and left platform members 12 and 14 to permit the desired swivelling and universal movement of the creeper when used as such. When the creeper combination is used as a stool, I prefer to provide a pair of slotted washer members 84 fastened adjacent the two corners of the extended edges of the platform members 12 and 14 so that when used as a stool the device will be supported at four points instead of along the entire edges of the lower part of the right and left platform members. With this construction, while a sufficiently rigid and solid base is provided, the supports also permit easy movement of the stool as such, which avoids wear upon the edges of the right and left platform members.

From the above and foregoing description it can be seen that I have provided a comparatively simple yet capable and efficient construction of automobile mechanics' combined creeper and stool for use in working upon and under automobiles. The device is capable of being locked in a flattened position to be used as a creeper and wheeled about under the automobile, and when desired, by pressing upon the kick-out lever 76, the spring member 48 will raise the assembled and hinged members so that the right and left platforms become legs or supports for the center platform and the device provides a stool or seat for the mechanic.

The latch members which hold the stool rigidly in this position can not be disturbed except by extremely heavy pressure upon the kick-out lever 76 which withdraws the latch bolts 34 and 36, and against the resistance of spring 48 the platforms may be spread out in alignment with the center platform, and when aligned therewith the same are automatically locked in a flattened position.

From the above and foregoing description it can be seen that I have provided a comparatively simple yet very practical combination creeper and stool so that mechanics may employ the same both for working in a reclining position beneath a car, as well as for use in sitting or standing next to the car for work upon the same.

I contemplate that changes and modifications may be made in the exact details shown and I do not wish to be limited in any particular; rather what I desire to secure and protect by Letters Patent of the United States is:

1. A combination automobile creeper and stool comprising a center and right and left rectangularly shaped platforms, hinge members connecting both the right and left platforms to said center platform, all of said platforms normally in the same plane, a pair of lock bolts mounted on the underside of said center platform engaging slots in said right and left platforms for holding the three platforms in flat planar alignment, a kick-out lever on the center platform connecting the locker bolts for releasing said lock bolts, and spring means connected between the right and left two edges of said hinged platforms for raising the same to inclined planes supporting said center platform.

2. An automobile creeper comprising a rectangular center platform and right and left rectangular platform portions hingedly connected to said center platform, said right and left platform portions having openings in a wall of each platform adjacent the sides of said center platform, lock bolts carried by said center platform extending into said openings, spring means connected to the side walls of said right and left platform portions, and means for releasing said lock bolts to permit said spring to draw said side platforms together.

3. An automobile creeper comprising a rectangular center platform and right and left rectangular platform portions hingedly connected to said center platform, said right and left platform portions having openings in a wall of each platform adjacent the sides of said center platform, lock bolts carried by said center platform extending into said openings, spring means connected to the side walls of said right and left platform portions, and means for releasing said lock bolts to permit said spring to draw said side platforms together, said means comprising a kick-out lever mounted in said center platform and connected to both of said lock bolts.

References Cited in the file of this patent

UNITED STATES PATENTS

| Number | Name | Date |
| --- | --- | --- |
| 1,072,052 | Stoehr | Sept. 2, 1913 |
| 1,098,262 | Hollingshead | May 26, 1914 |
| 1,209,447 | Johnson | Dec. 19, 1916 |
| 1,394,493 | Grazer | Oct. 18, 1921 |
| 1,668,379 | Radvanyi | May 1, 1928 |
| 2,595,784 | Griffin et al. | May 6, 1952 |

FOREIGN PATENTS

| Number | Country | Date |
| --- | --- | --- |
| 223,662 | Germany | June 29, 1910 |
| 253,615 | Switzerland | Nov. 16, 1948 |
| 900,372 | France | Oct. 2, 1944 |